Feb. 22, 1938.  C. W. GREEN  2,108,884
CASH REGISTER
Original Filed March 27, 1931   8 Sheets-Sheet 2

Feb. 22, 1938.　　　C. W. GREEN　　　2,108,884
CASH REGISTER
Original Filed March 27, 1931　　8 Sheets-Sheet 3

FIG. 3

Inventor
Charles W. Green
By Carl Benst
His Attorney

Feb. 22, 1938. C. W. GREEN 2,108,884
CASH REGISTER
Original Filed March 27, 1931 8 Sheets-Sheet 4

Inventor
Charles W. Green
By Carl Beust
His Attorney

FIG. 7

Inventor
Charles W. Green
By Carl Benst
His Attorney

Feb. 22, 1938.                C. W. GREEN                2,108,884
                              CASH REGISTER
                Original Filed March 27, 1931    8 Sheets-Sheet 6

FIG. 8

Inventor
Charles W. Green
By Carl Beust
His Attorney

Feb. 22, 1938. C. W. GREEN 2,108,884
CASH REGISTER
Original Filed March 27, 1931 8 Sheets-Sheet 7

FIG. 9

Inventor
Charles W. Green
By Earl Bennett
His Attorney

FIG.10

Patented Feb. 22, 1938

2,108,884

UNITED STATES PATENT OFFICE 2,108,884

CASH REGISTER

Charles W. Green, Dayton, Ohio, assignor to The National Cash Register Company, Dayton, Ohio, a corporation of Maryland Original application March 27, 1931, Serial No. 525,630. Divided and this application April 4, 1936, Serial No. 72,686

11 Claims. (Cl. 235—23)

This invention relates to cash registers and analogous devices, and particularly to that type having a plurality of totalizers for registering totals of various transactions entered by the individual clerks, and also having printing and indicating mechanism to indicate data relating to such transactions, and is a division of the application for United States Letters Patent of Charles W. Green, Serial No. 525,630, filed March 27, 1931 now patent No. 2,063,031, which issued December 8, 1936.

The object of this invention is to provide a novel indicating mechanism and controlling means therefor for such types of machines.

A more specific object of this invention is to provide novel means associated with the indicators for positively actuating the indicators to indicate data corresponding to that set up on the keyboard of the machine, and to positively lock the indicators after they have been positioned under control of the keys.

With these and incidental objects in view, the invention includes certain novel features of construction and combinations of parts, the essential elements of which are set forth in the appended claims, and a preferred form or embodiment of which is hereinafter described with reference to the drawings which accompany and form part of this specification.

General description

Figure 1:
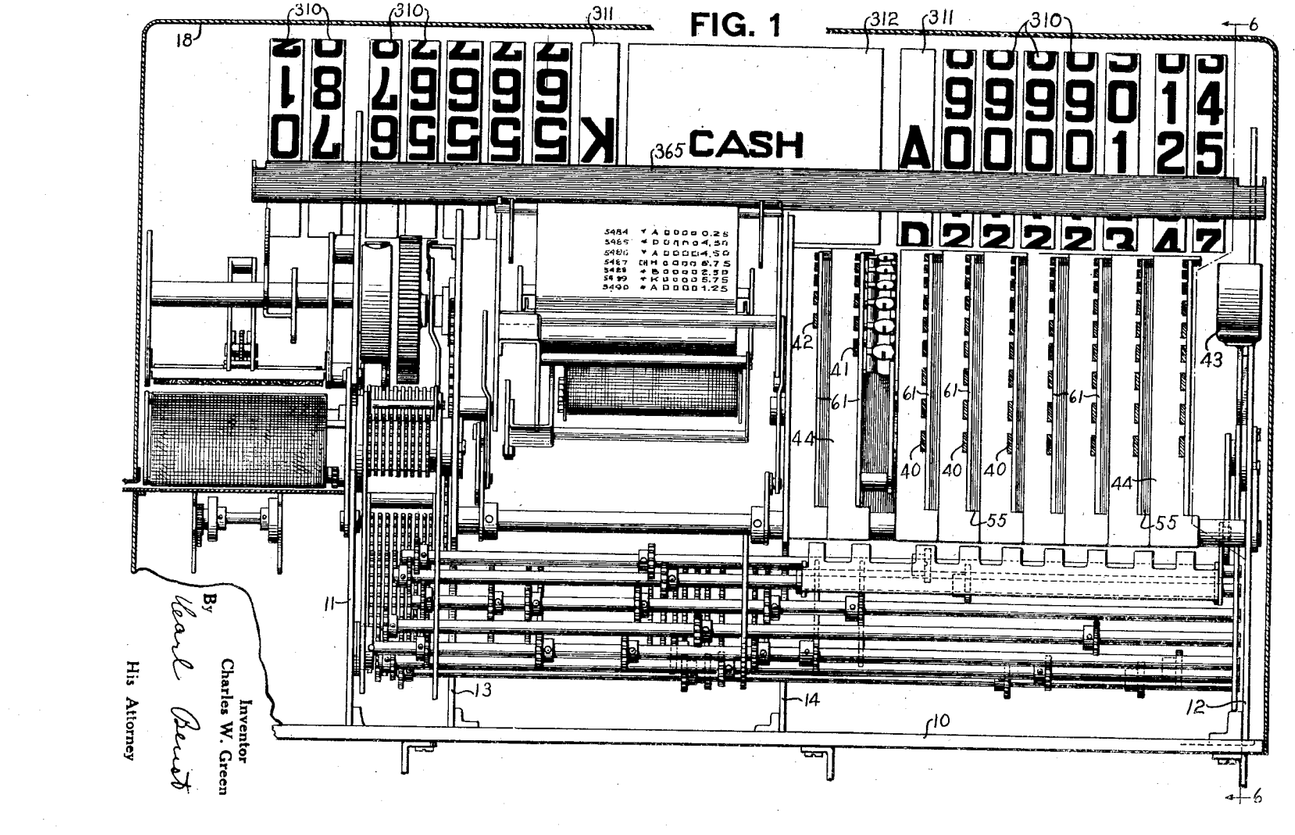
Fig. 1 is a front elevational view with the front portion of the cabinet removed, showing the general arrangement and location of the indicators and the keyboard for controlling the same.

Described in general terms, this divisional application relates particularly to indicator mechanisms under the control of banks of keys, and for the purposes of this divisional case, it will be sufficient here to state that the differentials are controlled by several banks of amount keys, a bank of clerks' keys, and a bank of transaction keys, the general locations of which are shown in section in Fig. 1.

These keys control differential mechanisms and, more specifically, differentially adjustable segments having associated therewith a series of connections for adjusting indicators.

The indicators provided in the illustrated machine are of the "drum" type, and are so arranged that the amount of each transaction entered in the machine, as well as a legend representing the clerk who entered the transaction and a legend designating the kind of transaction, are displayed at both the front and the rear of the machine. This mechanism is so constructed that the indicators will be moved from one position to another without first being returned to a zero or starting position.

Framework

The various parts of the machine are supported by a suitable framework, comprising a base 10 (Figs. 1, 2, 9, and 10), two side frames 11 and 12, and two intermediate frames 13 and 14, all attached to the base by suitable means.

The mechanisms contained in the machine are enclosed by a cabinet 18 provided with suitable openings for receiving the key banks and other control mechanisms, as fully disclosed in the above mentioned parent case.

Operating mechanism

The operating power is imparted to the various mechanisms of the machine by a main operating shaft 20 (Figs. 2 to 8, and 10), which is driven by a hand crank 22 (Fig. 3) through the medium of gears 33, 34, and 35.

The shaft 20 may also be driven by an electric motor of the type fully illustrated and described in the United States Patent No. 1,144,418, issued June 29, 1915, to Charles F. Kettering and William A. Chryst.

Keyboard

The keyboard of the machine is comprised of seven banks of amount keys 40 (Figs. 1, 7, and 8), one bank of clerks' keys 41, and one bank of transaction keys 42. The clerks' and transaction keys are shown only in section in Fig. 1. A motor bar 43 (Figs. 1 and 3) is provided for effecting release of the machine. The keys of each bank are supported in frames 44 mounted in the usual manner on cross rods 46 and 47.

For the purposes of this case it will be sufficient to state that each bank of amount keys controls a zero stop pawl 72 (Figs. 7 and 8) through the medium of detents which are fully illustrated and described in the parent case.

Differential mechanism

The present machine is provided with a positively operated differential mechanism for controlling and setting the indicators. As shown in Figs. 2, 4 and 6 to 8, a cam 230 and its companion cam 231 are secured to the drive shaft 20 and cooperate with rollers 232 and 233 on arms 234 and 235 respectively of a lever 236 pivoted on a shaft 185. Integral with the lever 236 is a segmental gear 238 meshing with a gear segment 239 secured to a shaft 240. Also secured to the shaft 240 is a series of driving segments 241, one for each bank of amount keys.

Since the structure and operation of the driving segments and of the differential mechanism associated therewith are the same for all of the amount banks of keys, a brief description of the structure and operation of one will suffice for all, and, for the purposes of illustration, the units bank differential mechanism will be used.

Pivoted on the shaft 240 is a differential segment 242 carrying a pawl 245 pivoted at 245'. This pawl has a projection 246 which normally engages a notch 243 of its associated driving segment 241. A projection 247 of the pawl is adapted to engage in any one of a series of notches 248 in its corresponding differential latch retaining plate 61.

Figures 4, 5, 6:
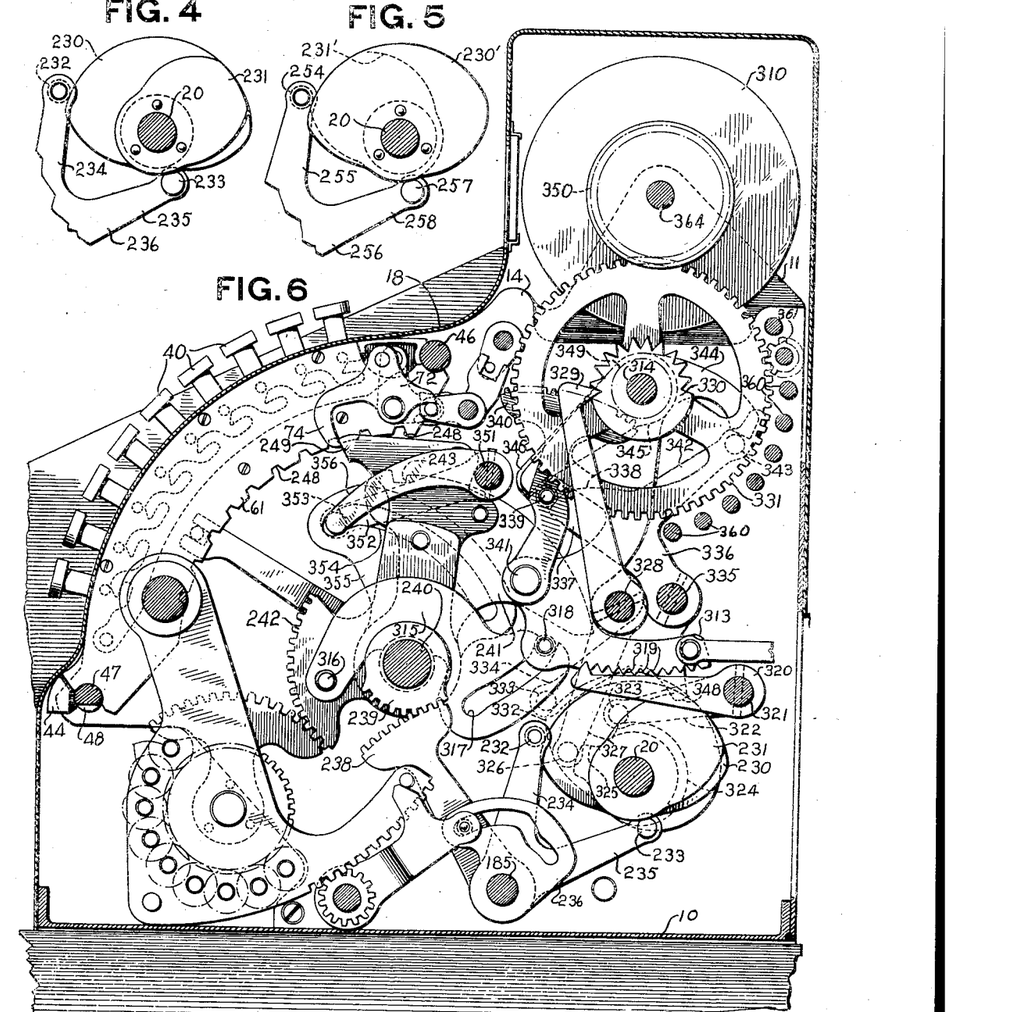
Fig. 4 is a detail view of the amount differential operating cams.
Fig. 5 is a detail view of the clerks' and transaction differential operating cams.
Fig. 6 is a section taken on line 6—6 of Fig. 1.
Figure 7:
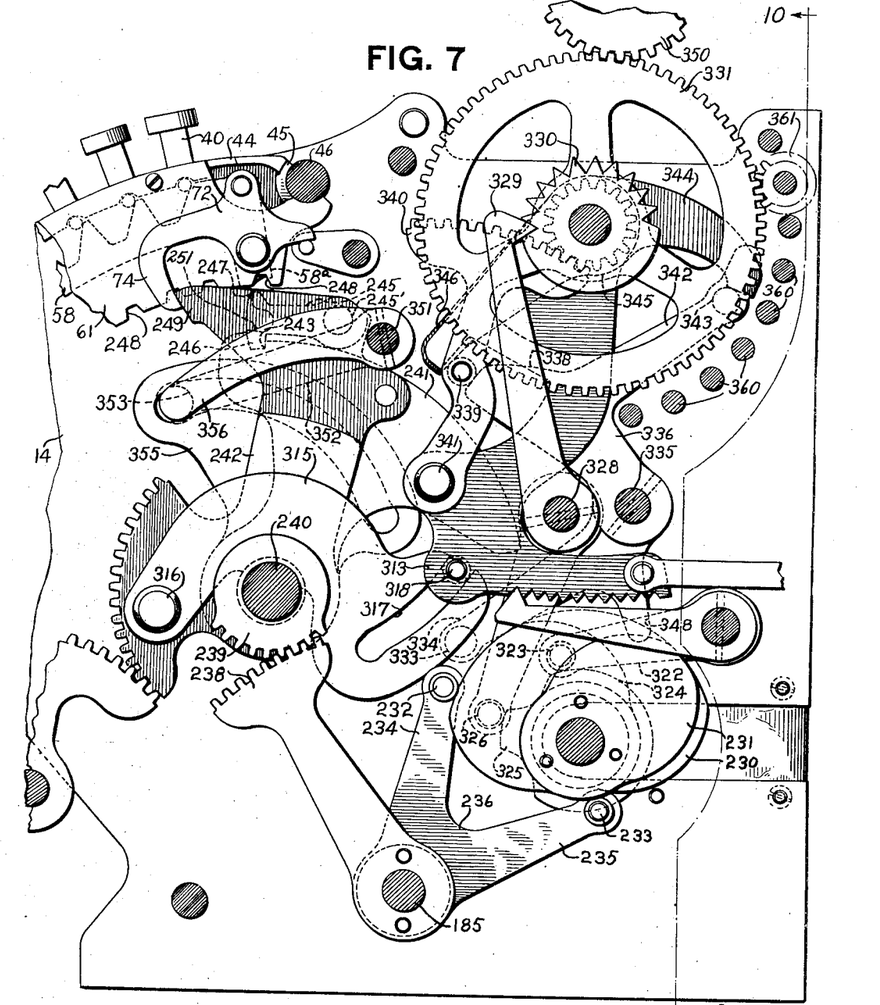
Fig. 7 is a partial elevational view showing the differential and indicator mechanisms and a portion of the key section.

In Figs. 6 and 7, the parts are shown in their normal positions, wherein a nose 249 of the differential segment engages an arm of the zero stop pawl 72. Therefore, if no key in that bank is depressed upon operation of the driving shaft 20, the cams 230 and 231 rock the lever 236 clockwise, whereupon the segmental gear 238 and segment 239 rock the shaft 240 and the driving segment 241 counterclockwise. In this case, however, the differential segment 242 will be held against movement by its contact with an arm 74 of the zero stop pawl 72, with the result that the pawl 245 will be disengaged from its driving segment 241, and the projection 247 of the pawl will enter the first notch 248 in the plate 61. The segments 241 will continue their downward movement until they reach their limit of travel, after which the cams 230 and 231 will return them to their normal positions, whereupon the notch 243 will again register with the projection 246 of the pawl 245 and will drop into the notch by gravity.

When a key 40 of an amount bank is depressed, the arm 74 of the zero stop pawl will be swung away from the nose 249 of the differential segment 242, and the associated segment 241 will carry the differential segment downwardly until stopped by the particular key depressed.

When a key is depressed, the foot 58a (Figs. 7 and 8) on a cam plate 58 associated therewith will close the first notch 248, which normally is adapted to receive the projection 247 of the pawl 245 when the machine is operated with no key depressed in that bank. The lower end of each key has a cam face 250 and the forward end of the latch pawl 245 has a notch 251. Therefore, when the differential segment 242 is moved downwardly by its driving segment 241, the notch 251 engages the end of the depressed key, thus camming the pawl 245 clockwise, causing its projection 247 to enter the notch 248 adjacent the depressed key. In this manner the differential segment 242 is disengaged from the driving segment 241 and is held in adjusted position by the engagement of the projection 246 on the latch pawl 245 with the concentric surface 244 of the driving segment 241.

During the same operation of the machine, each driving segment is returned to normal position, thus causing a projection 253 thereon to engage the projection 246 of its associated pawl 245. By this action, the projection 246 of the pawl 245 will reenter the notch 243 of its driving segment 241, and, consequently, the associated differential segment 242 will be returned to home position.

From the above description it can be clearly seen that during an item entering operation the differential segments 242 will first, be positively adjusted by their segments 241 a distance determined by the respective keys depressed, and then positively restored to their normal positions.

Figure 8:
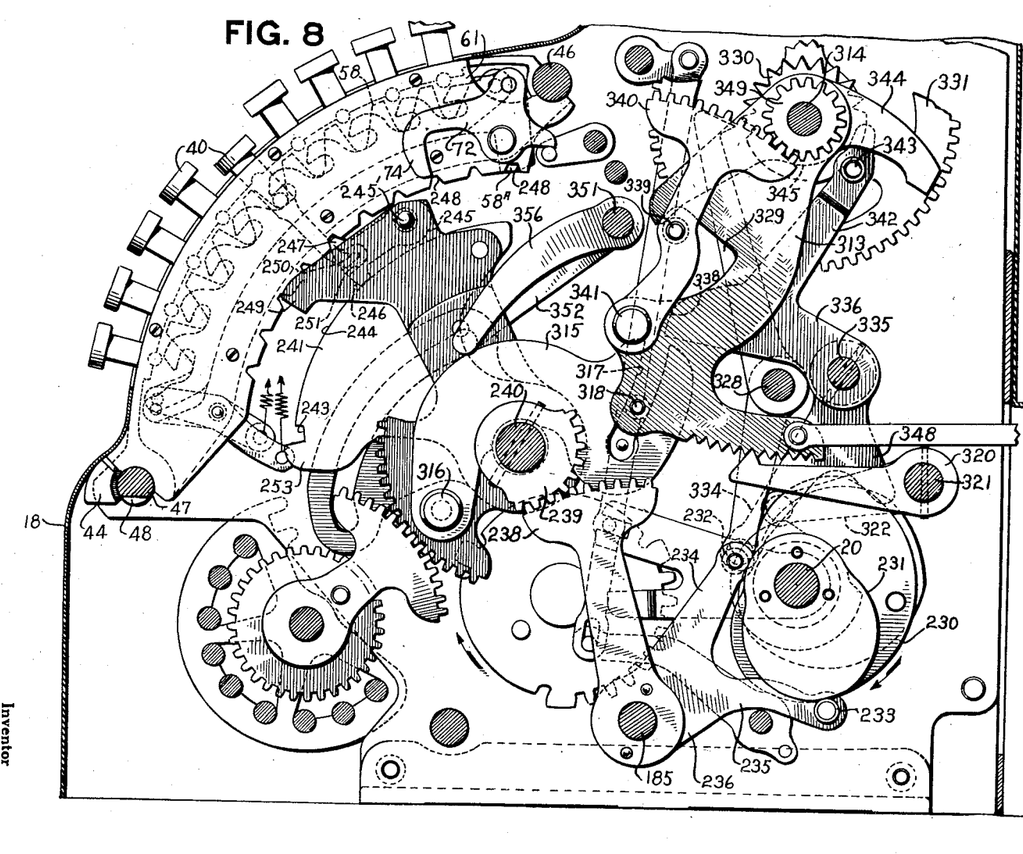
Fig. 8 is an elevational view illustrating the respective positions of the parts in the differential and indicator mechanisms when the main operating shaft has been operated substantially 100 degrees and when a key in an amount bank has been depressed.

Fig. 8 shows the parts associated with the units or penny bank of keys in operated position when the five-cent key has been depressed. The nose 249 of each differential segment 242 swings between a related retaining plate 61 and the key spring retaining plate 55 (Fig. 1) of the next adjacent key section. Thus, the differential segments are prevented from moving laterally.

The differential mechanisms associated with the clerks' and transaction banks of keys are substantially the same as those associated with the amount banks, except that the driving segments for the clerks' and transaction differential segments are not restored to normal positions simultaneously with the restoration of the driving segments for the amount differential segments. The clerks' and transaction banks of keys are not provided with zero stop pawls, since the differential segments for those banks will be operated for each operation of the machine, as it requires the depression of a transaction key and a clerks' key, in combination with the motor bar, to release the machine for operation.

Figure 2:
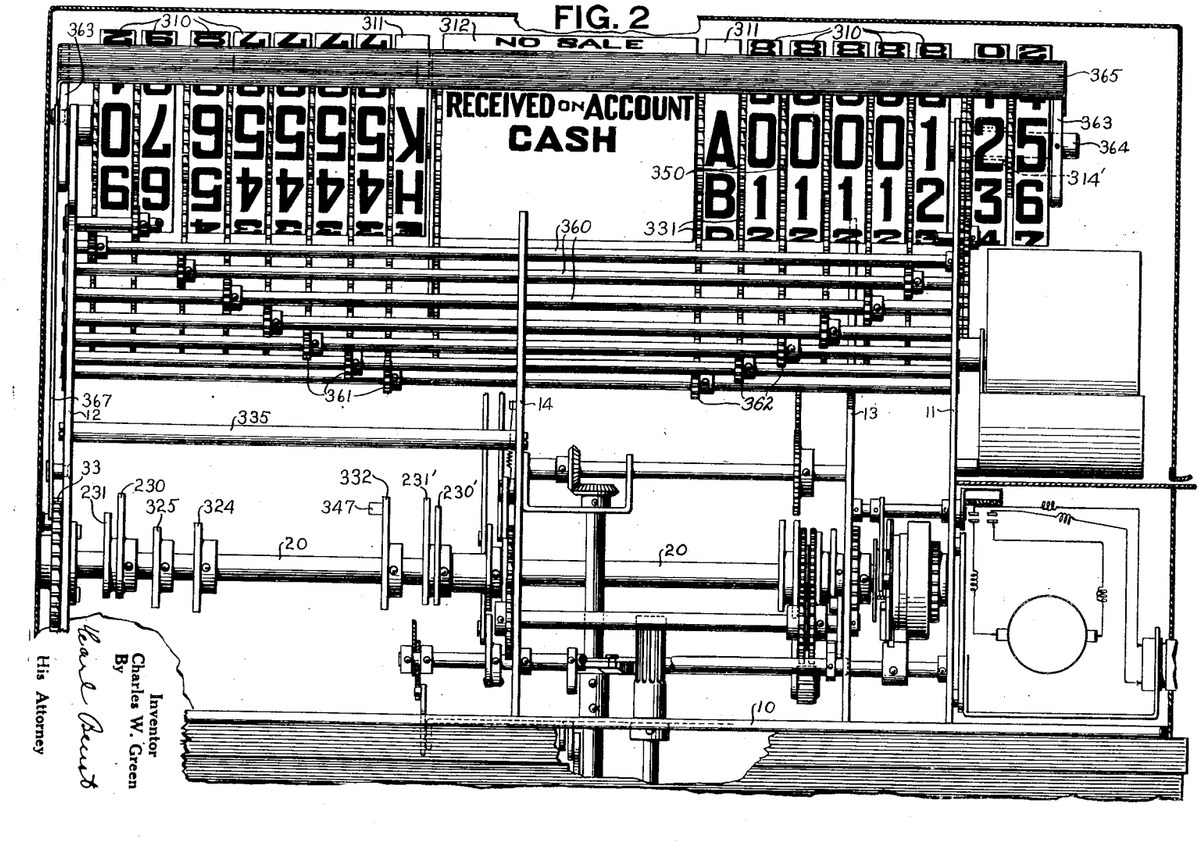
Fig. 2 is a rear elevational view of the machine with the back portion of the cabinet removed, showing particularly the transmission lines to transpose the indication so that it reads correctly from the back of the machine.
Figure 3:
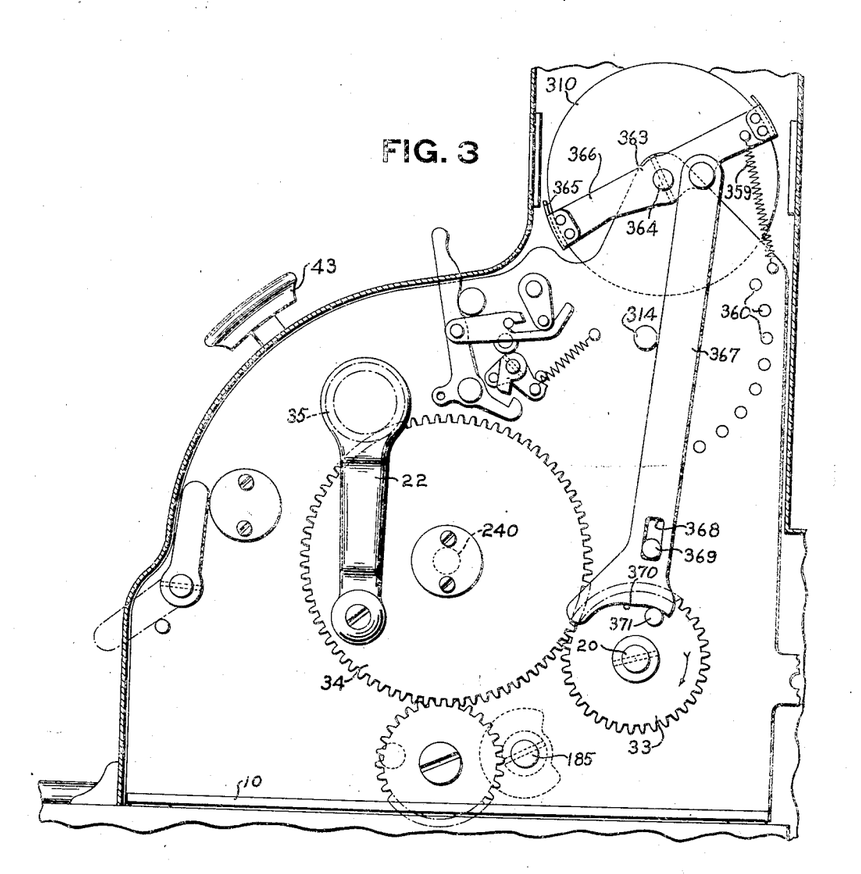
Fig. 3 is a right-hand elevation of the machine showing particularly the main operating mechanism and the indicator flash mechanism.
Figure 9:
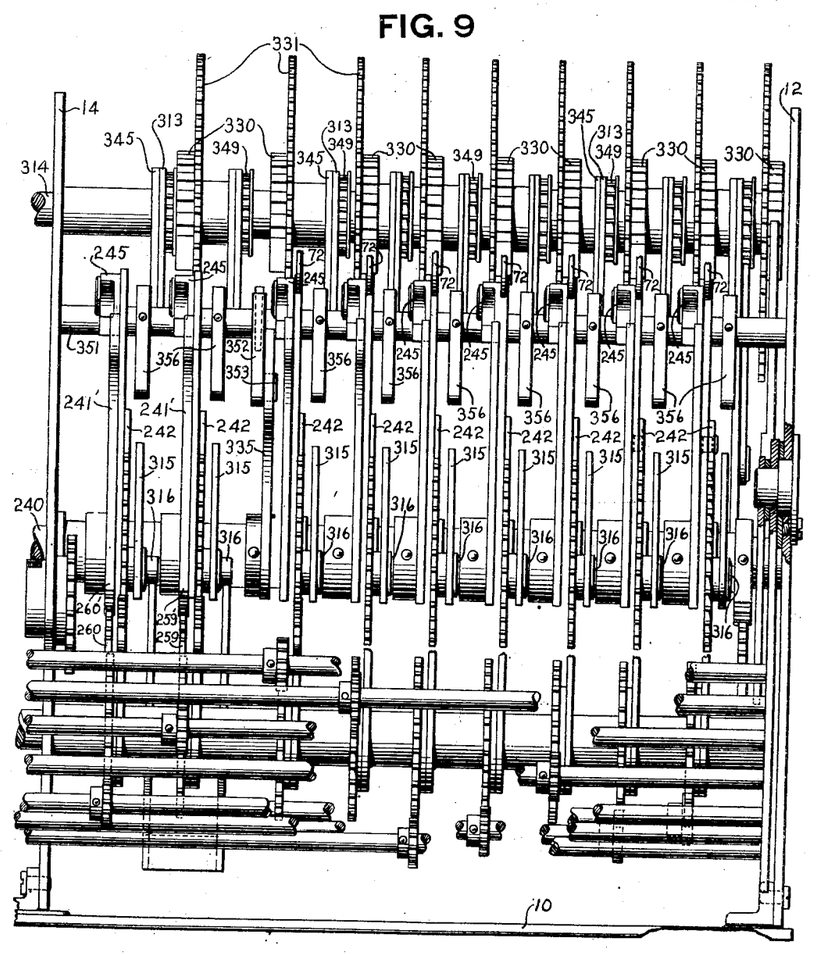
Fig. 9 is a partial front elevation showing the differential mechanism and a portion of the drive for the indicator mechanism.
Figure 10:
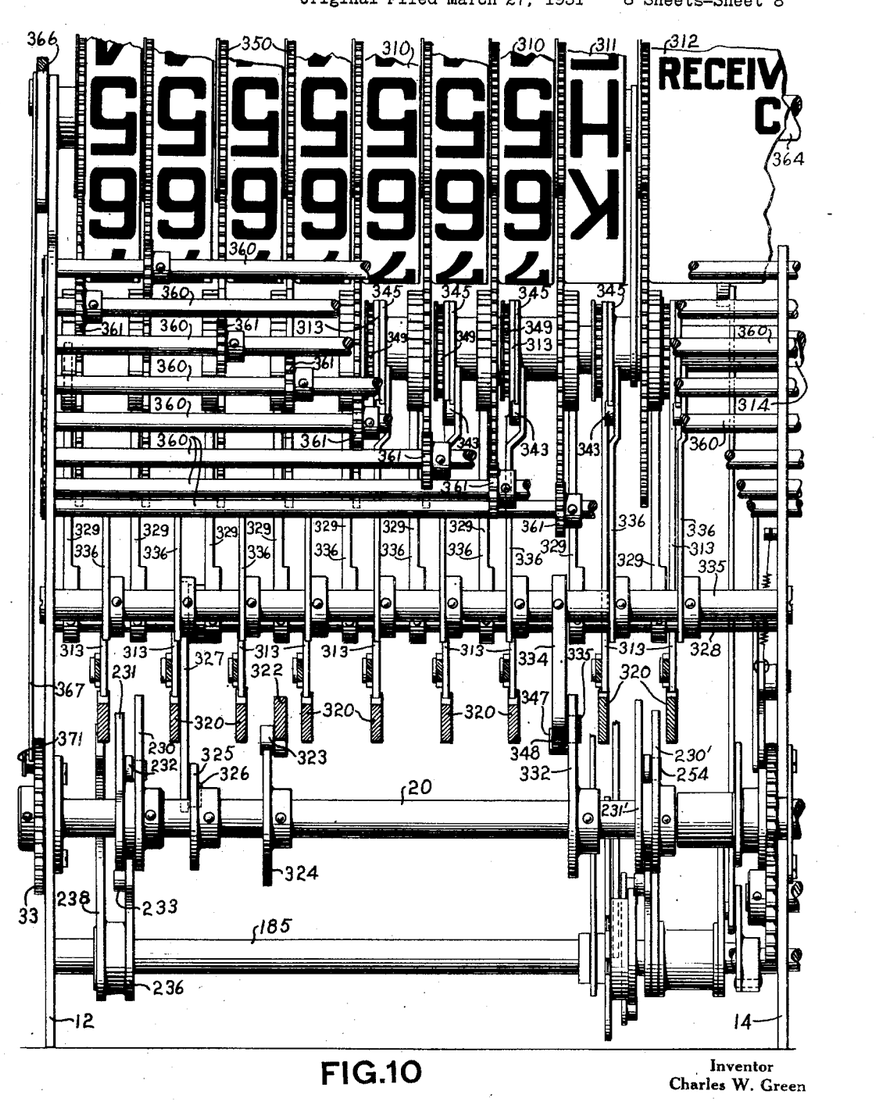
Fig. 10 is a sectional view taken on line 10—10 of Fig. 7, showing the indicator transmission line broken away to more clearly show the direct driving connections from the differential to the indicators.

As shown in Figs. 2, 9, and 10, there is a pair of driving segments 241' loose on the shaft 240 to actuate the clerks' and transaction differential segments 242. A cam 230' (see also Fig. 5) and its companion cam 231' secured to the shaft 20, through the rollers 254 and 257 on the arms 255 and 258 of a lever 256 pivoted on the shaft 185, and the actuating segments 259 and 260 meshing with the gear segments 259' and 260', actuate the driving segments 241' upon rotation of the main shaft 20 to drive the clerks' and transaction differential segments 242. As mentioned above, the driving segments 241' remain in their operated positions while the driving segments 241 for the amount differentials are restored to their normal positions. During a latter period in the operation of the machine, the driving segments 241 are restored to their normal positions and likewise restore their respective differential segments 242 to normal positions.

Indicator mechanism

The indicators provided in the illustrated machine are of the drum type, and are arranged so as to display, at both the front and rear of the machine, the indicia corresponding to each key depressed. The amount and clerks' indicators 310 and 311 respectively (Figs. 1 and 2), are arranged in pairs and are simultaneously operated by mechanism which will be described in detail, hereinafter. One transaction indicator 312 is provided and is positioned between the front and rear indicators. This indicator is provided with two similar sets of transaction indicia, one for displaying, at the front of the machine, the indicia representing the kind of transaction entered in the machine and the other for displaying similar information at the rear of the machine.

Referring more particularly to Figs. 6 to 10, it will be seen that there is one indicator differential segment 313 and associated mechanism for each bank of keys. Since the structure and operation of each are the same, a description of one will suffice for all. For the purpose of illustration, a description of the mechanism associated with the units order will be given.

Each indicator differential segment 313 is pivoted on a shaft 314 journaled in the main supporting frames 11, 12 and 14, and is differentially actuated by a beam 315 pivoted at 316 to a stud provided on a corresponding differential segment 242. A cam slot 317 is provided in the rearwardly extending portion of each beam 315 which receives a roller 318 provided at the lower forward end of a corresponding indicator differential segment 313. The lower edge of each segment 313 is provided with a series of serrations 319 (Fig. 6) which are adapted to be engaged by a corresponding holding pawl 320. Pawls 320 are pinned to a shaft 321 which is journaled in supporting frames 12 and 14. An arm 322 carrying a roller 323 at the forward end thereof is also pinned to shaft 321. A cam 324 fixed to the main driving shaft 20 engages roller 323 and is provided for the purpose of imparting a rocking movement to all of the arms 320 to engage them with their respective serrations 319, aforesaid, and thus positively hold segment 313 in adjusted position. Also pinned to shaft 20 is a cam 325 which engages a roller 326 provided at the lower end of an arm 327 fixed to a shaft 328, which shaft is also journaled in supporting frames 12 and 14. Also fixed to shaft 328 are a series of alining pawls 329 which are adapted to engage in the serrations provided in the alining wheels 330 attached to gears 331 for adjusting the indicator drums.

As shown in Figs. 6 and 10, a cam 332 pinned to shaft 20 engages roller 333 provided at the lower end of an arm 334 pinned to a shaft 335, which shaft is journaled in supporting frames 12 and 14. Also pinned to shaft 335 are a series of two-arm levers 336, one for each indicator unit. The forward arm 337 of lever 336 is provided with a cam face 338 which is adapted to engage a pin 339 carried by a segmental gear 340. Segmental gear 340 is pivoted at 341 to its respective indicator differential segment 313. The upper rearwardly extending arm 342 of lever 336 carries a pin 343 which is adapted to be engaged by an arm 344 of a two-arm lever 345 loosely mounted on shaft 314. The arm 344 is formed with a cut-away portion and an abutting or locking surface which engages the pin 343 to lock the actuating segment 340 when the pin 339 thereon has been brought to its normal position. The cut-away portion of arm 344 allows the two-arm lever 345 to be rocked clockwise during a setting operation if the adjustment of 340 so requires. The forwardly extending arm 346 of lever 345 is adapted to also engage the pin 339 provided on segment 340.

The above described parts are so constructed and arranged that immediately upon rotation of shaft 20 a cut-away portion of cam 324 will register with roller 323 on arm 322 and thereby permit all of the alining pawls 320 to drop out of engagement with the indicator differential segments 313. At substantially the same time, or shortly thereafter, the differential segments 242 will be actuated by their respective segments 241 with the result that the beams 315 will be actuated in a counter-clockwise direction about shaft 240. By this movement each beam will be moved about shaft 240, as a pivot, a distance commensurate with the value of the particular key depressed. During this movement, cam 317 will actuate its corresponding differential segment 313 a corresponding amount. When the differential segments 313 are thus positioned, cam 324 will engage roller 323 and rock the alining pawls 320 into engagement with their respective indicator differential segments 313, thereby holding them in adjusted position. At substantially the same time that the holding pawls 320 are disengaged from the indicator differential segments 313, a pin 347 (Fig. 10) on the cam 332 will engage a tail 348 provided on arm 334 and will rock shaft 335 in a counter-clockwise direction thereby bringing pin 343 out of engagement with the abutting surface on arm 344 of lever 345. The indicator differentials may now be moved in either direction.

It is clear from the construction of the parts, that when they are in the position shown in Figs. 6 and 7, the indicators as well as the actuating parts are locked against operation due to the engagement of arms 344 and 346 of lever 345, with pins 339 and 343 and the engagement of the forward arms 337 of levers 336 with the pins 339. However, when each lever 336 is rocked to the position shown in Fig. 8, due to the cut-away portion of arm 344, the corresponding two-arm lever 345 will be free to move, thereby permitting movement of the indicator differential segments 313 in either direction. Before the differential segments 313 have been thus positioned, cam 325 will have released roller 326 and thereby rock the indicator alining pawls 329 out of engagement with their respective alining wheels 330. Upon further operation of the main driving shaft 20 the cam 332 operating on the roller 333 attached to the lower end of lever 334 will rock the shaft 335 in a clockwise direction thereby causing the cam face 338 provided on lever 336 to engage pin 339 and rock segment 340 on its pivot 341. The gear segment 340 meshes with a pinion 349 (Fig. 8) attached to a corresponding large gear 331 (Fig. 6) which in turn meshes with a gear 350 attached to a corresponding indicator drum. If the arm 345 has been rocked clockwise, the pin 343 will engage the cut-away portion of arm 344 to rock it to its normal position, in which pin 343 may engage the abutting surface on arm 344.

From the construction of the parts just described, it is seen that the pin 339 will occupy the same position at the end of each operation of the machine. In this manner the indicators will be positioned the proper amount. It will be remembered that when an indicator differential 313 is positioned in the manner aforesaid, it is locked in adjusted position by locking pawl 320. Thus, when the differential segment 242 associated therewith is returned to normal position the pivot point of beam 315 will be restored to normal position with the result that the beam will fulcrum about its corresponding pin 318 as a pivot, thereby moving the beam away from shaft 240.

At the beginning of a subsequent operation of the machine, it is necessary to restore the beams 315 to normal in order to properly position the indicator differentials to a new position. Restoration of the beams takes place simultaneously with the movement of the differential segments 242 after the locking pawls 320 have been moved out of engagement with their indicator differential segments 313. Thus, both movements are effected at substantially the same time with the result that the indicator differential is moved a distance corresponding to the resultant of the two movements of the beam, or the resultant of the movement of its corresponding beam 315 toward the shaft 240 and also of the movement thereof about shaft 240 as a pivot.

In order to restore the beams 315 into engagement with shaft 240 the following mechanism is provided:

Fixed to a shaft 351, Figs. 6 and 7, and journaled in side frames 12 and 14 is an arm 352 carrying a roller 353 at the forward end thereof which roller operates in a cam slot 354 provided in a segmental plate 355 fixed to shaft 240. Also pinned to shaft 351 are a series of curved arms 356, one for each beam 315.

From this construction it is seen that when shaft 240 is rocked counterclockwise the cam plate 355 will rock the shaft 351 counterclockwise thereby bringing the end portions of arms 356 into engagement with the upper surface of their respective beams 315. At this time, it will be remembered the indicator differential segments 313 have been released for operation and this motion is transmitted to the respective segments 313 by cam slot 317 acting on rollers 318 of each indicator differential segment. When shaft 240 is returned by rocking in a clockwise direction the arms 356 will be moved away from the beams and the latter are then permitted to again move away from the shaft 240 to permit the indicator differentials 313 associated therewith to remain in adjusted positions. By this construction it is seen that the indicators are moved from one position to another without first returning them to a zero or starting position. This constructional arrangement obviously eliminates considerable stress on the parts and provides an efficient operating mechanism for the indicators.

In order to adjust the indicators so that the indicia may be viewed from the rear of the machine, a transmission line is provided. Referring to Figs. 2, 6 and 10, it will be seen that a plurality of shafts 360 are provided which shafts are journaled in supporting frames 11, 12 and 14 (Fig. 6). These shafts are mounted in an arc about gears 331, as shown in Figs. 6 and 7. A pinion 361 is pinned to each shaft 360, which pinion meshes with a corresponding gear 331. Spaced from each pinion 361 on its respective shaft 360 is another pinion 362 which meshes with a similar gear 331 for adjusting a corresponding rear indicator drum. There is one such shaft and pair of pinions for each amount indicator and also one for the clerk's indicator. Thus, it is clear that when the gears 331 are actuated in the manner previously described, this movement through pinions 361 and 362 is transmitted to a similar gear 331 associated with the rear indicators. It will be noted from Fig. 2 that the rear indicator drum for the unit denominational order is moved through a sleeve 314' in order to avoid the necessity of an extension of its respective shaft 360 to the right of side frame 11.

It is desirable to conceal the indicators during adjustment thereof and to this end a flash 363 (Figs. 2 and 3), is provided. This flash is mounted on indicator supporting shaft 364 journaled in side frames 11, 12 and 14. This concealing means is in the form of a bail having arcuate shaped concealing portions 365 located at substantially diametrically opposite sides of the drum. These concealing portions are attached to a pair of arms 366 at each end thereof. Attached to one of the arms 366 adjacent the supporting frame 12 is a pitman 367 which is provided with a slot 368 near its lower end, which receives a pin 369 provided in side frame 12. The lower end of pitman 367 is provided with a cam face 370 which is adapted to be engaged by stud 371 fixed to gear 33. A spring 359 tends to rock the concealing member in a clockwise direction. From the description of the above mechanism it is clear that when gear 33 is rotated in the direction of the arrow upon operation of the main driving shaft 20, stud 371 will be moved out of engagement with cam 370 and pitman 367 will be permitted to drop, thereby bringing the concealing portions 365 into position to conceal the indicators. Toward the end of an operation of the machine, stud 371 will again engage cam 370 thereby moving pitman 367 upwardly to move the concealing portions 365 to inoperative positions. The slot 368 is so constructed as to limit the movement of the concealing member in either direction.

Summary of operation

A brief description of the operation of the mechanism will now be given.

When one of the amount keys is depressed, and the machine released for operation by depression of the motor bar 43, the amount driving segments 241 actuate the differential segments 242 until the pawls 245 contact the ends of the depressed keys, whereupon the segments 242 are disengaged from the segments 241, which continue downwardly until they reach the limit of their movement.

In a like manner the driving segments 241' for the clerks' and transaction banks actuate the differential segments 242 associated therewith under control of the keys depressed in those banks.

Through the beams 315, the indicator differential segments 313 are set according to the values of the keys depressed, after which the locking pawls 320 (they having first been disengaged from the segments 313) are again moved into engagement therewith to hold them in their adjusted positions. Consequently, when the segments 242 are restored, the beams 315 fulcrum around the pins or rollers 318, thus leaving the indicator segments 313 remaining in their adjusted positions. The gear segments 340 are now operated by the train of mechanism including the cams 332, arm 334, shaft 335, and levers 336, whereby the segments 340, through the gears 349 and 331, adjust the related indicators to the positions corresponding to the keys depressed.

At the same time, motion is transmitted from the front set of indicators 310 to the rear set of indicators 310 by the series of transmission shafts 360 and pinions 361 and 362, shown particularly in Fig. 4.

While the form of mechanism herein shown and described is admirably adapted to fulfill the objects primarily stated, it is to be understood that it is not intended to confine the invention to the one form of embodiment herein disclosed, for it is susceptible of embodiment in various forms, all coming within the scope of the claims which follow.

What is claimed is:

1. In a machine of the class described, the combination of a series of keys; a differentially adjustable actuator adapted to be controlled as to extent of adjustment by said keys; a pivotally mounted driven member; a beam supported by said actuator provided with means for adjusting said driven member, an indicator; a segment carried by said driven member having a projection thereon; a two-arm lever, one arm thereof engaging said projection; and a second two-arm lever, one arm thereof being provided with a cam surface for engaging said projection, a second arm thereof having a projection adapted to engage the other arm of said first mentioned lever, said parts being so constructed that upon operation of the machine, said second mentioned lever will be actuated to adjust said segment to position said indicator, the projection of said segment being restored to a normal point at the end of each operation of the machine.

2. In a machine of the class described, the combination of a series of keys, a pivoted actuator common to all of said keys and adapted to be controlled as to extent of travel by said keys; a driven member; means for pivotally supporting said driven member; a beam supported by said actuator for adjusting said driven member; means for holding said driven member in adjusted position; a gear mounted on the supporting means for said driven member; means carried by said driven member for actuating said gear; and means for positively actuating and locking said last mentioned means.

3. In a machine of the class described, the combination of a series of keys, a pivoted actuator common to all of said keys and adapted to be controlled as to extent of travel by said keys; a pivotally supported driven member; supporting means for the driven member; a beam supported by said actuator for adjusting said driven member; means for holding said driven member in adjusted position; a gear concentric with the pivot of said driven member; an actuating segment for said gear pivotally supported on said driven member; a pair of two-arm levers, one of said levers being pivoted on the supporting means for said driven member, the other being pivoted on a shaft adjacent thereto; and means for driving said other lever, said levers being so constructed and arranged that upon operation of the driving means for said other lever, said segment will first be positively actuated, and then locked in operated position.

4. In a machine of the class described, the combination of a series of keys; a differentially adjustable actuator adapted to be controlled as to extent of adjustment by said keys; a pivotally mounted driven member; a beam supported by said actuator provided with a cam for adjusting said driven member; an indicator; a segment carried by said driven member for adjusting said indicator, said segment being provided with a projection; a two-arm lever, one arm thereof engaging said projection; and a second two-arm lever, one arm thereof being provided with a cam surface for engaging the projection on said segment, the second arm thereof having a projection adapted to engage the other arm of said first mentioned lever, said parts being so constructed that upon an operation of the machine, after said driven member has been adjusted by said beam, said second mentioned lever will be actuated to adjust said segment to position said indicator.

5. In a machine of the class described, the combination of a series of keys, a differentially adjustable actuator adapted to be controlled as to the extent of adjustment by said keys; a pivotally supported driven member, an indicator, a beam supported by said actuator for adjusting said driven member a distance commensurate with the movement of said actuator, a segmental gear pivotally supported on said driven member; connections from said segmental gear to said indicator; a projection carried by said segmental gear adapted to be engaged by one arm of a two-arm lever; the other arm thereof being provided with an abutting surface and a cut away portion; a projection carried at the outer end of one arm of a second two-arm lever adapted to engage said abutting surface, the other arm thereof being provided with a cam portion for engaging the projection of said segmental gear, said parts being so constructed that during adjustment of said driven member by said beam, the projection carried by said second mentioned lever can engage in the cut away portion of said first mentioned lever; means for holding said driven member in adjusted position; and means for actuating said second mentioned two-arm lever to first, cause adjustment of said segment, and then cause locking thereof in adjusted position.

6. In a machine of the class described, the combination of a series of keys; a differentially adjustable actuator controlled by said keys; an indicator; a driven member; means intermediate said actuator and said driven member to operate the latter under control of the actuator; minimum movement actuating means for moving said indicator to exhibit data as set up on the keys; and means for operating said minimum movement actuating means to set the indicator directly from a previously set position to a new position under control of said driven member while said driven member remains stationary.

7. In a machine of the class described, the combination of a series of keys; a differentially adjustable actuator controlled by said keys; an indicator; a driven member; means pivoted to said actuator and connected to said driven member for operating the latter under control of the actuator; minimum movement actuating means for said indicator, including an element carried by said driven member; and a plurality of members for operating said minimum movement actuating means to set the indicator directly from a previously set position to a new position under control of said driven member.

8. In a machine of the class described, the combination of a series of keys; a differentially adjustable actuator controlled by said keys; an indicator; a pivoted driven member; means intermediate said actuator and said driven member for operating the latter under control of the actuator; means pivoted on one end of said driven member for actuating said indicator; and means for operating said pivoted means to set the indicator under control of said driven member.

9. In a machine of the class described, the combination of a series of keys; a differentially adjustable actuator controlled by said keys; an indicator; a pivoted driven member; means for differentially positioning the driven member under control of said actuator; a support for said driven member; gears mounted on said support for driving the indicator; and means pivoted on the driven member adjacent one end thereof for operating said gears to position the indicator under control of said driven member.

10. In a machine of the class described, the combination of a series of keys; a differentially adjustable actuator controlled by said keys; an indicator; a pivoted driven member; means controlled by said actuator for differentially positioning said driven member; gears for actuating said indicator; a device pivoted on said driven member for operating said gears; and means including a plurality of levers and a projection on the device and one on one of said levers, said levers and projections cooperating to actuate said device and to lock said device after actuation thereof.

11. In a machine of the class described, the combination of a series of keys; a differentially adjustable actuator controlled by said keys; an indicator; a driven member; means controlled by said actuator for differentially positioning said driven member; means carried by said driven member and adapted to be differentially positioned therewith; and means for restoring a portion of the last mentioned means to normal position independently of said driven member for setting the indicator under control of the driven member and for locking said portion of the last mentioned means in its normal position.

CHARLES W. GREEN.